United States Patent [19]

Haley, Sr.

[11] Patent Number: 4,549,748

[45] Date of Patent: Oct. 29, 1985

[54] TRANSPORTABLE AND COLLAPSABLE BAG CARRYING CART

[76] Inventor: Thomas S. Haley, Sr., 14 Hemlock Ct., Cromwell, Conn. 06416

[21] Appl. No.: 597,700

[22] Filed: Apr. 6, 1984

[51] Int. Cl.$^4$ .............................................. B62B 3/02
[52] U.S. Cl. .................................... 280/641; 248/98; 248/99; 280/651
[58] Field of Search .................. 280/641, 651, 39, 42, 280/33.99, 639; 248/95, 97, 98, 99; 428/99, 100; 24/230.5 R; 220/404, 403; 211/42

[56] References Cited

U.S. PATENT DOCUMENTS

| | | | |
|---|---|---|---|
| 2,967,716 | 1/1961 | Murcott | 280/641 |
| 3,000,645 | 9/1961 | Schmidt | 280/39 |
| 3,149,724 | 9/1964 | Magers | 211/42 |
| 3,443,971 | 5/1969 | Wood | 220/404 |
| 3,633,932 | 1/1972 | Holden | 280/641 |
| 3,999,639 | 12/1976 | Walters | 428/100 |
| 4,281,814 | 8/1981 | Verwey | 248/97 |
| 4,318,520 | 3/1982 | Walker | 248/97 |
| 4,339,141 | 7/1982 | Thiboutot | 280/42 |
| 4,418,835 | 12/1983 | Watts | 220/404 |

Primary Examiner—Joseph F. Peters, Jr.
Assistant Examiner—Everett G. Diederiks, Jr.
Attorney, Agent, or Firm—Fishman & Dionne

[57] ABSTRACT

A transportable and collapsable bag holding cart for use in collecting and conveying materials such as bedding, laundry or trash in a hotel, hospital or the like is presented. The cart is provided with a slidable cover assembly for easy opening and closing. Also, Velcro- type self-adhesive strips and bag retension safety bars are provided to prevent plastic and cloth bags from slipping under a load. Finally, the cart is foldable for easy storage and is self contained when folded or in use. Various attachments including a multi-cart connecting device and additional basket assemblies are also presented herein.

46 Claims, 8 Drawing Figures

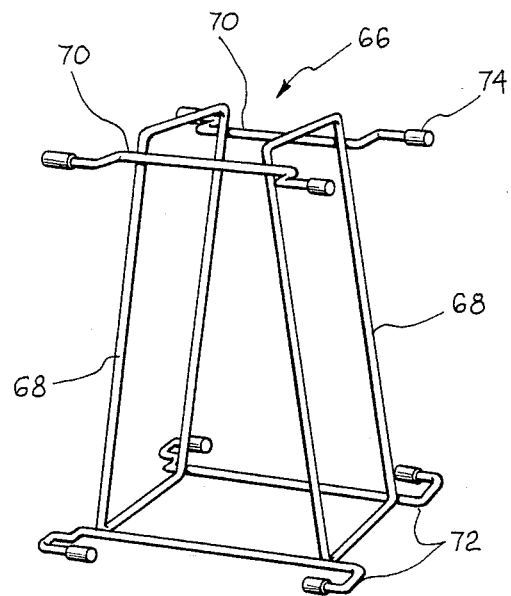
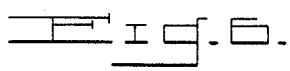
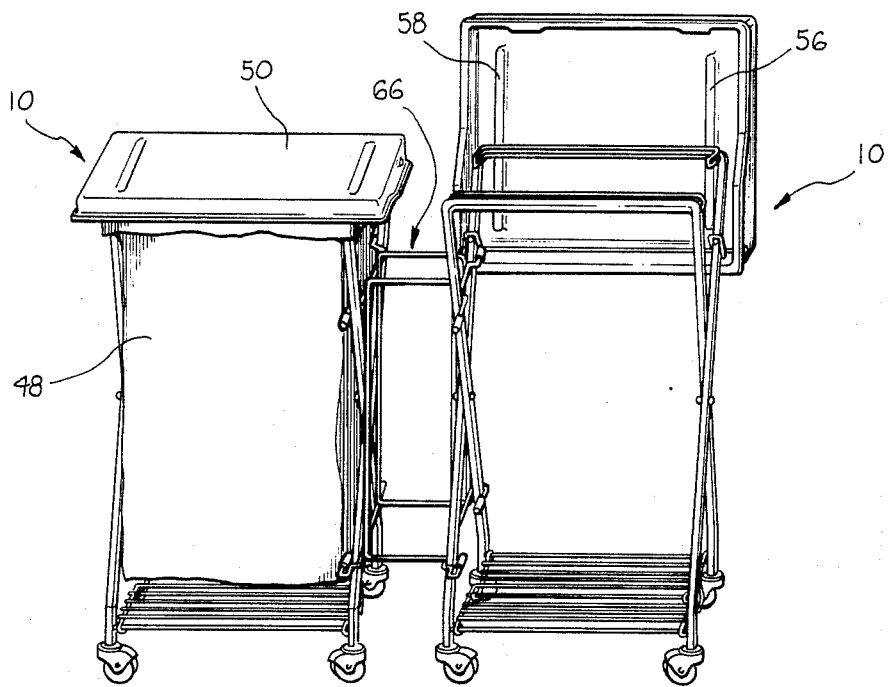

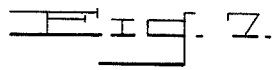
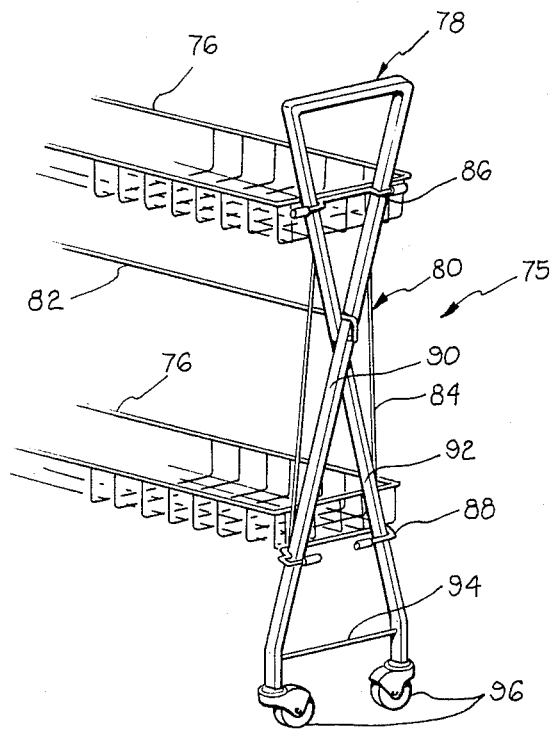
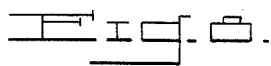
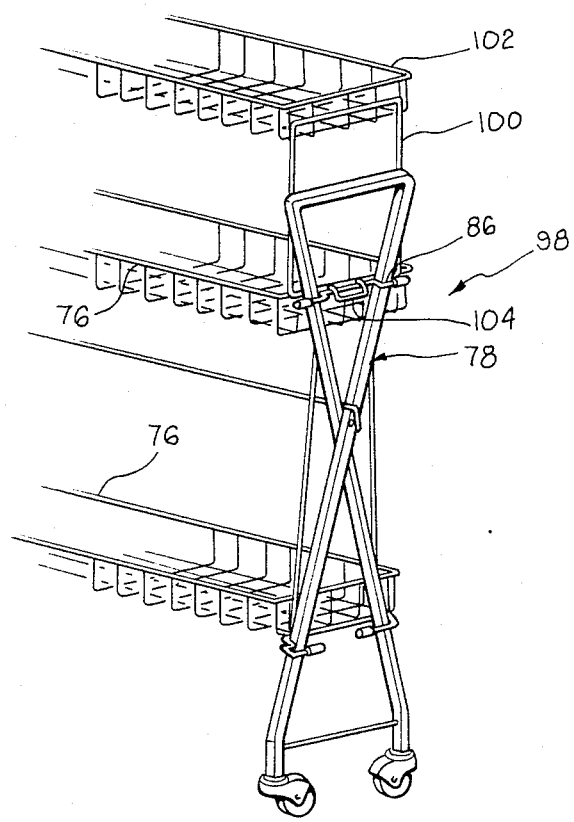

TRANSPORTABLE AND COLLAPSABLE BAG CARRYING CART

BACKGROUND OF THE INVENTION

This invention relates to a transportable bag holding device for use in collecting and conveying materials such as bedding, laundry or trash in a hotel or hospital. More particularly, this invention relates to a new and improved bag carrying cart provided with novel slidable lid means for easy opening and closing. Also included are bag retension safety bars for preventing a bag thereon from slipping off the cart under a load and means for folding the cart so as to permit storage. Most importantly, the storage cart is a self contained unit having no separable pieces, either when in use or when folded for storage.

The use of collapsable mobile frames which are adapted to support flexible canvas or plastic sack or bags for the collection of bedding, laundry or similar articles in hotels, hospitals or other institutions are known in the art. For example, U.S. Pat. No. 3,633,932 to Holden discloses a bag holding device formed by a pair of U-shaped frame members having a bag supporting platform adjacent the base of the frame which is formed by a pair of pivotally interconnected overlapping plate members adapted to maintain the stability of the device when the frame members are pivoted to an open or extended configuration. Each frame member is provided with a pivotally mounted bail like member having a bight portion extending upwardly along and beyond the top of its associated frame member which is adapted to support a bag inserted in the device and supported at its top by a turned-down cuff portion which extends over the bails and down around the periphery of the frame members.

Another device to support a disposable plastic bag is disclosed in Shaw, U.S. Pat. No. 3,806,146. This device comprises a grate-like stand mounted on runners or wheels. The stand supports two pairs of vertical members, each pair connected by a horizontal cross member. The lip of a disposable plastic bag is folded down over the cross members to keep the mouth of the bag open. Shaw also discloses a lid to cover the open mouth of the bag. The lid is specially formed with two spaced apart hooks which encircle a substantial portion of one of the horizontal cross members to which they are attached. The hooks and cross member act as a hinge on which the lid rotates. The lip of the plastic bag is held between the hooks and the cross member. This requires the lid to be removed before the bag may be replaced. In addition, the bag is vulnerable to perforation where the hooks contact it. This may lead to the bag slipping from the frame or to the ultimate tearing of the bag.

Other devices to support bags for soiled linens and trash are described in U.S. Pat. Nos. to Cole 296,135, Verwey 4,281,814 and Grille 3,608,542. None of these patents disclose easily transportable bag support devices which, among other undesirable features, detract from their efficiency and convenience.

Finally, of general interest are the U.S. Pat. Nos. to McSwain 3,870,261, Wilson 3,659,816 and Walker 4,318,520 (which is allegedly an improvement over the Wilson patent). It will be understood that the above prior art patents may not comprise all the pertinent prior art, but is merely being mentioned as indicative of the self-standing bag holding devices typically known in the art.

All of the above mentioned prior art devices suffer from a variety of deficiencies and problems. For example, with the increasing use of plastic bags (versus linen or cloth bags), problems have developed with slippage of the bags off the bag holding frame. This slippage is increased, in part, because poor quality control in bag manufacture allows bags of varying thickness and tolerances.

Other problems with prior art devices concern the covers or lids which may require complicated assembly and therefore incur high costs. Also, many of these covers simply do not perform adequate opening and closure.

Moreover, many prior art bag holders cannot be folded or collapsed during storage resulting in the need for increased storing facilities and greater costs; and there are no known units in the prior art which are self contained both in use and in storage.

Finally, as mentioned, certain prior art holders or carts are not easily transportable, a very desirable feature from the standpoint of labor efficiency and convenience.

It would be advantageous, therefore, to provide a movable bag holding cart which overcomes the above problems. Furthermore, it would be equally advantageous to provide a cart with novel features and attachments not found in the prior art such as multiple cart connectors and additional basket assemblies.

SUMMARY OF THE INVENTION

The above discussed and other problems of the prior art are overcome or alleviated by the transportable bag holding cart device of the present invention. In accordance with the present invention, a novel bag holding device for use in collecting and conveying materials such as bedding, laundry or trash in a hospital, hotel or other institution is provided.

The bag holding cart of the present invention is comprised, in part, of a pair of inverted U-shaped frame support members pivotally connected at about their respective centers. A foldable base is provided to the lower portion of the cart, the base preferably having a locking means attached thereto. The cart is movable along conventional wheels or casters for easy transport. The upper portion of each inverted U-shaped support member is provided with novel bag retension safety bars which help to preclude bags, especially plastic bags, from sliding off the frame after material has been deposited therein. Finally, a novel cover or lid assembly effects adequate closure while permitting ease of opening.

In a preferred embodiment, Velcro-type strips (the hooks) are also provided to the upper portion of the U-shaped support members. The Velcro strips will act to secure a strong attachment between the cart and heavier fabric bags to which have been sewn Velcro-type pile strips.

Also provided in the present invention are novel attachments which may be used in conjunction with one or more carts. These attachments include a connecting device which effects easy connection between two or more carts. Also, basket attachments are provided which easily connect two or more carts together. These attachments provide increased flexibility of the present invention to different and needed applications.

The novel bag holding cart and related attachments of the present invention overcome many of the problems discussed earlier in relation to the prior art. Thus, the bag retention safety bars prevent plastic bags from slipping off the frame while the Velcro-type strips provide a similar function for heavier fabric bags.

Other features such as the novel lid assembly and folding feature similarly provide desired improvements. Moreover, the various attachments allow heretofore unknown flexibility and permit new applications for bag holding carts of this type.

The above discussed and other advantages of the present invention will be apparent to and understood by those skilled in the art from the following detailed description and drawings:

BRIEF DESCRIPTION OF THE DRAWINGS

Referring now to the drawings, wherein like elements are numbered alike in the several FIGURES:

FIG. 5 is a perspective view of a cart connector attachment in accordance with the present invention.

FIG. 6 is a front view of the connector of FIG. 5 shown connecting two carts together.

FIG. 7 is a partial perspective view of a two basket cart attachment in accordance with the present invention.

FIG. 8 is a partial perspective view of a three basket cart attachment in accordance with the present invention.

DESCRIPTION OF THE PREFERRED EMBODIMENT

Figure 1:
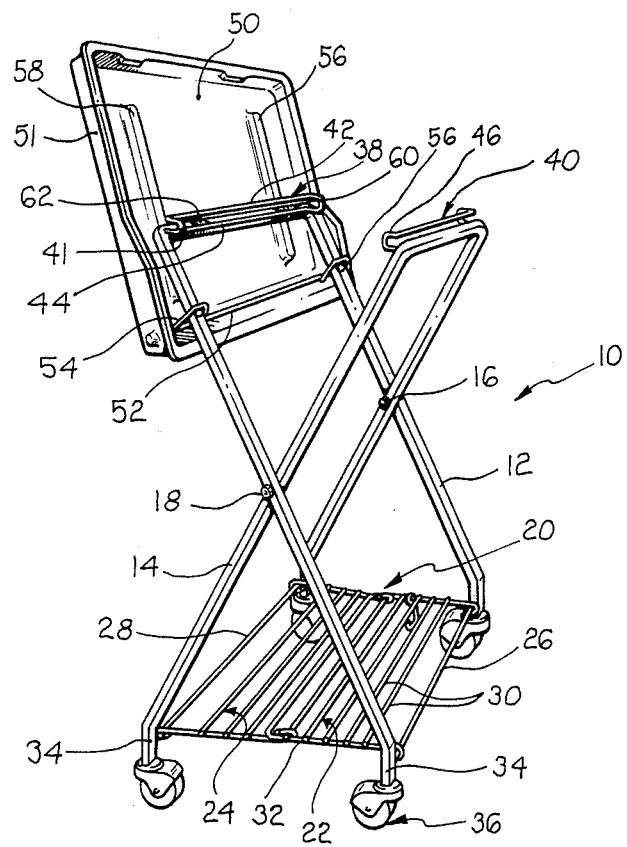
FIG. 1 is a perspective view of a cart in accordance with the present invention without a bag being inserted therein.
Figure 2:
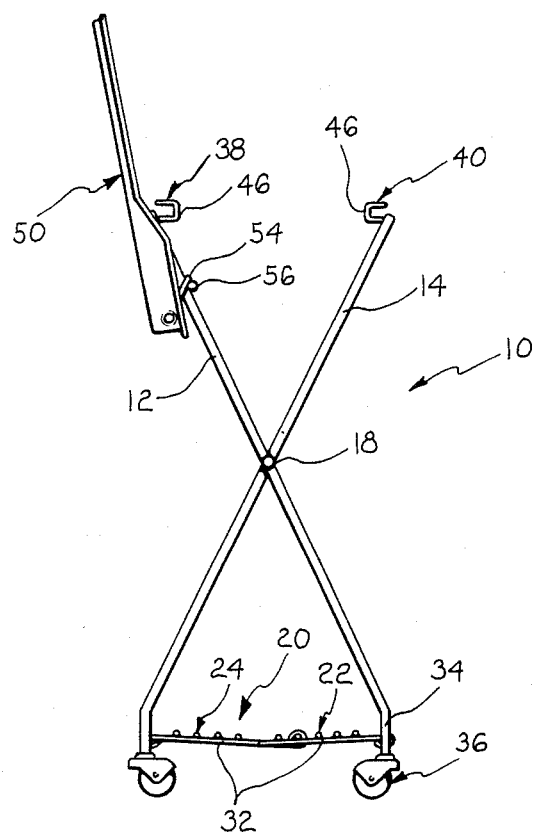
FIG. 2 is a side elevation view of the cart of FIG. 1.

Referring first to FIGS. 1 and 2, a bag holding transportable cart in accordance with the present invention is shown generally at 10. The cart 10 is comprised of a pair of inverted U-shaped frame support members 12 and 14 pivotally connected about two corresponding bearings 16 and 18. This pivotal connection is preferably along the center of each vertical leg of U-shaped members 12 and 14.

The U-shaped members 12 and 14 are also connected by a collapsable or foldable grill-like base 20. The base 20 provides support for the bags after material has been added therein. The base 20 is actually comprised of two separate grill portions 22 and 24. A pair of rigid connecting rods 26 and 28 interconnect and brace each individual U-shaped member. Thus, connecting rod 26 fixedly connects both vertical legs of U-shaped frame member 12 while rod 28 fixedly connects both vertical legs of U-shaped frame member 14. Each grill portion 22 and 24 is comprised of a plurality of perpendicular rods including longitudinal rods 30 and at least four latitudinal rods 32. The latitudinal rods 32 each have end loop sections which pivotally interconnect with one another and with the rigid connecting rods 26 and 28. This pivotal connection permits the entire cart frame to fold as will be discussed in more detail below. Finally, as shown in FIGS. 1 and 2, each U-shaped member 12 and 14 has a vertical straight section 34 which supports a convention caster or roller 36.

Figure 3:
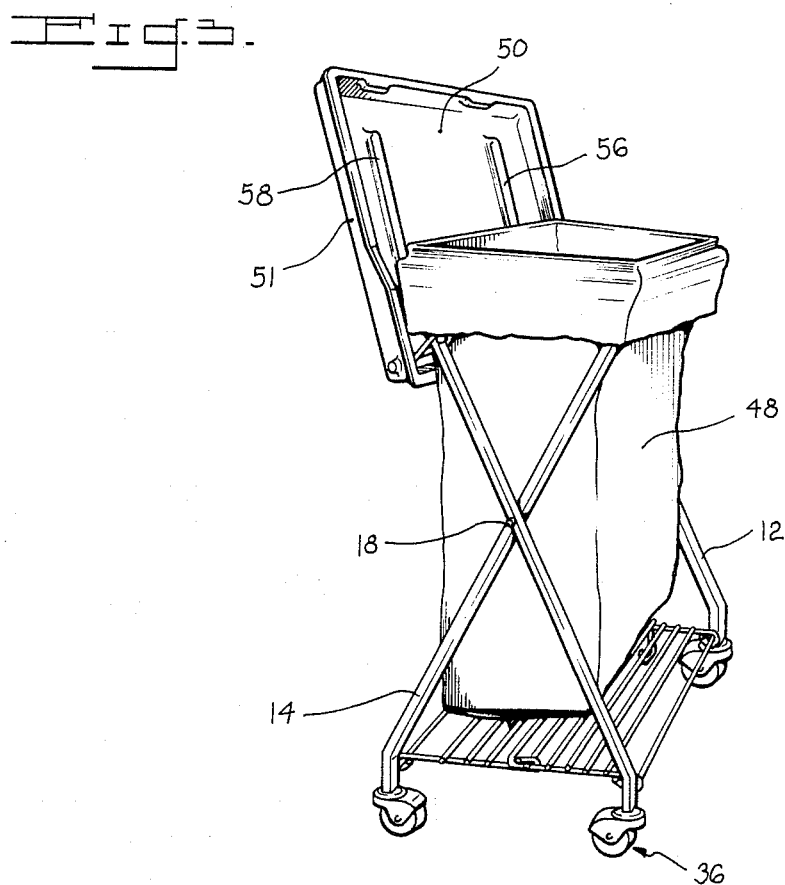
FIG. 3 is a perspective view of the cart of FIG. 1 having a bag inserted therein.

Each of the two cross-piece segments of U-shaped members 12 and 14 are provided with a pair of novel bag retension safety bars identified at 38 and 40. These bars 38, 40 are preferably welded onto U-shaped frames 12 and 14, respectively. Safety bars 38 and 40 are preferably comprised of two parallel straight portions 42 and 44 interconnected at each end by a U-shaped retaining member 46. As shown in FIG. 3, when either a plastic or cloth bag 48 is mounted onto the cart 10, the bag should be mounted so as to overlap and fit tightly about the two safety bars 38 and 40. If a heavy load is added to the bag 48 and the bag is plastic, the bag will be urged downwardly (and the overlap urged upwardly). In accordance with the present invention, if the bag slides as suggested, the outer edges thereof will slip into the notches provided by the two safety bars 38 and 40 and be securely loaded therein. As a consequence thereof, plastic bags 48 will be prevented from prematurely slipping out of the cart 10. It will be appreciated that the bags should not be lifted upwardly out of the cart during changing, but instead should be removed from the front of the cart frame.

Referring again to FIGS. 1-3, a novel lid or cover assembly is provided to the cart 10. The cover assembly includes lid 50 having depending side portions 51, pivoting shaft 52 rotatably attached between two opposing depending side portions 51, U-shape hinges 54 rigidly attached to shaft 52 and preferably, spherical support stops 56. In FIG. 1, the lid 50 is shown in an open position and is resting, via the U-shaped hinges 54, on support stops 56. In order to effect closure, the lid 50 is merely lifted whereupon the U-shaped hinges 54 will slide upwardly along the upper portion of the frame member 12. Thereafter, the lid 50 is pivoted or swung downwardly about hinges 54 until the lid 50 rests upon both safety bars 38 and 40 (see FIG. 6). In a preferred embodiment, two parallel channels 56 and 58, which depend downwardly relative to the top surface of the lid 50, act to secure the lid between the two safety bars.

Also, in a preferred embodiment, strips 60, 62 of Velcro-type self-adhesive material are applied to at least one of the cross-piece segments of U-shape members 12 and 14. Similarly, corresponding strips of Velcro-type fasteners are attached onto fabric (i.e., cloth, canvas, etc.) bags. Thus, when the fabric bags are mounted onto the cart as shown in FIG. 3, the Velcro-type fasteners will securely fix the heavier (relative to light weight plastic) fabric bags to the cart frame.

Figure 4:
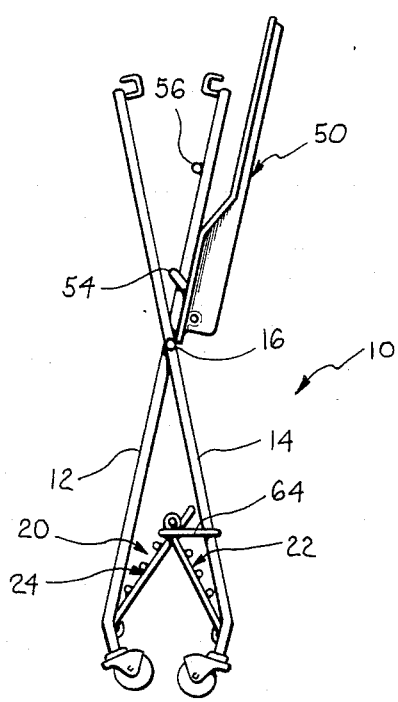
FIG. 4 is a side elevation view, similar to FIG. 2, but in a folded position.

Referring now to FIG. 4, the bag holding cart 10 is shown in a folded position for storage purposes. As mentioned earlier, the two U-shaped frame members 12 and 14 are pivotable about the pin connectors 16 and 18. Similarly, the base 20 is capable of being folded as heretofore discussed. Note that a locking hook 64 attached to one of the grill portions 22 or 24 acts to securely retain the cart in a folded position.

An important feature of the novel cover assembly is also shown in FIG. 4 wherein the U-shaped hinges 54 are swung over the two support stops 56 thus permitting the lid 50 to slide downwardly against the "V" section formed by the criss-crossing frame members 12 and 14. Accordingly, the folding feature of the present invention allows great savings of space for efficient storage purposes.

Most importantly, it is to be noted that the cart of the present invention is self contained, when in use or when folded for storage. That is, it has no separable parts, whether in the operable state or folded for storage.

In FIGS. 5 and 6, a novel connecting device shown generally at 66 provides interlocking engagement between two carts 10. Thus, the connecting device 66 will permit any number of carts 10 to be connected thereby facilitating transport of plural carts. The connector 66 is essentially comprised of a pair each of three component parts including substantially rectangular rod pieces 68 and upper and lower connecting brackets 70 and 72, respectively, all of which are shaped to provide a snap lock fit as discussed below. Rubber tips 74 provide protection at the ends of the brackets.

As shown in FIG. 6, the end portions of the connecting brackets 70 and 72 effect a secure snap-fit between the U-shaped frame members 12 and 14 and the connector 66. The secure fit is effected in part, by the inherent resiliency and memory forces of the upper and lower support brackets 70 and 72. It should be understood that while two carts 10 are shown interconnected in FIG. 6, any number of carts may be connected in this manner via additional connecting devices 66. No nuts, bolts or other fastening elements are needed to join the connecting element to two carts to connect the carts.

Referring now to FIGS. 7 and 8, two embodiments of basket attachments suitable for use in conjunction with a cart and in accordance with the present invention are shown. In FIG. 7, a two-basket arrangement 75 is shown comprised of a pair of baskets 76 connected to an end frame support 78 via a connecting bracket 80. Finally, a support bar 82 is preferably provided to add support to the mid-section of the basket assembly.

The baskets 76 may have a conventional rigid wire criss-cross structure and may be welded or otherwise connected to the connecting bracket 80. The connecting bracket 80 has essentially the same structure as ½ of the connecting device 66 of FIG. 5. Thus, a bracket frame 84 has connected at either end an upper and lower support bracket 86 and 88 as in connecting device 66. The end frame support 78 can be of a one piece construction basically comprising two lengths of straight rod members 90 and 92 forming a cross at about the middle thereof. A small support brace 94 adds support to the rod members 90 and 92. Finally, conventional casters or rollers 96 are provided to permit rolling and ease of moving. Although not shown, the basket assembly 75 would be connected at the side opposite the end frame support 78 to a cart 10 via an additional connecting bracket 80. Alternatively, the end frame support 78 may be removed and the basket assembly 75 could then be connected between two carts 10 via a pair of connecting brackets.

In a further alternative embodiment, a three basket assembly 98 is shown in FIG. 8. This basket assembly 98 is identical to the assembly 75 of FIG. 7 except for the addition of a substantially rectangular frame 100 which is welded or otherwise connected to an upper basket 102. An extension member 104 on frame 100 slides between the middle basket 76 and the upper support bracket 86 to effect a firm connection between the top basket 102 and the end frame support 78. It has been found that the three basket assembly 98 may not be as desirable as the two basket assembly 75 since the upper basket 102 may adversely obstruct the lid 50 of a cart 10 which has been connected thereto.

Similarly, as in the two basket assembly 75, the three basket assembly will be attached to a cart 10 at the end opposite the frame support 100. Also, as in the two basket configuration, the three basket assembly 98 may be connected between two carts 10 via a pair of connecting brackets.

It will be understood that while two and three basket assemblies have been shown, any number of baskets may be equally utilized in conjunction with the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A foldable bag holding cart comprising:
   first and second frame means, said first frame means pivotally connected to said second frame means, each of said first and second frame means having an inverted U-shape, said U-shape including two substantially vertical legs having a cross-piece member therebetween;
   collapsable base means pivotally attached to said first and second frame means;
   roller means connected to said first and second frame means whereby said cart is transportable;
   locking means whereby said cart is capable of being retained in a folded position;
   first and second bag retension bar means, said bar means being attached to said cross-piece members, each of said has retension bar means including two parallel straight portions interconnected at each end by a U-shape retaining member;
   slidable cover means, said cover means capable of being retained in at least an open position and a closed position.

2. The cart of claim 1 wherein said collapsable base means includes:
   a pair of pivotally connected grill portions.

3. The cart of claim 1 wherein said roller means comprises casters.

4. The cart of claim 1 wherein:
   said locking means is attached to said base means.

5. The cart of claim 4 wherein:
   said locking means is a hook.

6. The cart of claim 1 wherein at least one of said cross-piece members includes:
   at least one strip of Velcro-type fastener, said strip capable of mating with a corresponding strip of Velcro-type fastener on a bag.

7. The cart of claim 1 including:
   connecting means whereby two or more carts may be interconnected.

8. The cart of claim 1 including:
   basket attachment means.

9. The cart of claim 8 wherein said basket attachment means includes:
   at least one basket, said basket being connected to connecting bracket means; and
   end frame support means attached to said connecting bracket means, said end frame support means having roller means.

10. The cart of claim 9 including:
    support bar means whereby support is provided to the midsection of said basket attachment means.

11. The cart of claim 8 wherein said basket attachment means includes:
    plural baskets, said plural baskets being connected to connecting bracket means, said plural baskets being disposed over and vertically aligned with each other; and end frame support means attached to said connecting bracket means, said end frame support means having roller means.

12. A foldable bag holding cart comprising:

first and second frame means, said first frame means pivotally connected to said second frame means, collapsable base means pivotally attached to said first and second frame means;

roller means connected to said first and second frame means whereby said cart is transportable;

locking means whereby said cart is capable of being retained in a folded position:

first and second bag retension bar means, said bar means being attached to said first and second frame means; and slidable cover means, said cover means capable of being retained in at least an open position and a closed position, said slidable cover means including:

lid means having at least two opposite depending side walls;

pivoting shaft means rotatably attached between said side walls; and a pair of hinge means rigidly attached to said shaft, said hinge means being capable of sliding along at least one of said frame means.

13. The cart of claim 12 including:

support stop means being attached to at least one of said frame means thereby allowing said lid means to retain an open position.

14. The cart of claim 13 wherein:

said hinge means are capable of swinging over said support stop means during folding.

15. The cart of claim 13 wherein:

said stop means are spherically shaped.

16. The cart of claim 12 wherein:

each of said first and second frame means has an inverted U-shape, said U-shape including two substantially vertical legs having a cross-piece member therebetween.

17. The cart of claim 16 wherein:

said first and second bag retension bar means are rigidly connected to each of said cross-piece members.

18. The cart of claim 17 wherein each of said bag retension bar means includes:

two parallel straight portions interconnected at each end by a U-shape retaining member.

19. The cart of claim 16 wherein at least one of said cross-piece members includes:

at least one strip of Velcro-type fastener, said strip capable of mating with a corresponding strip of Velcro-type fastener on a bag.

20. The cart of claim 12 wherein said collapsable base means includes:

a pair of pivotally connected grill portions.

21. The cart of claim 12 wherein the roller means comprises casters.

22. The cart of claim 12 wherein:

said locking means is attached to said base means.

23. The cart of claim 22 wherein:

said locking means is a hook.

24. The cart of claim 12 including:

connecting means whereby two or more carts may be interconnected.

25. The cart of claim 24 wherein said connecting means comprises:

a pair of upper connecting bracket means;

a pair of lower connecting bracket means;

a pair of substantially rectangular rod pieces interconnecting said upper bracket means to said lower bracket means.

26. The cart of claim 12 including:

basket attachment means.

27. The cart of claim 26 wherein said basket attachment means includes:

at least one basket, said basket being connected to connecting bracket means; and end frame support means attached to said connecting bracket means, said end frame support means having roller means.

28. The cart of claim 24 including:

support bar means whereby support is provided to the midsection of said basket attachment means.

29. The cart of claim 26 wherein said basket attachment means includes:

plural baskets, said plural baskets being connected to connecting bracket means, said plural baskets being disposed over and vertically aligned with each other; and end frame support means attached to said connecting bracket means, said end frame support means having roller means.

30. A foldable bag holding cart comprising:

first and second frame means, said first frame means pivotally connected to said second frame means;

collapsable base means pivotally attached to said first and second frame means;

roller means connected to said first and second frame means whereby said cart is transportable;

locking means whereby said cart is capable of being retained in a folded position;

first and second bag retension bar means, said bar means being attached to said first and second frame means;

slidable cover means, said cover means capable of being retained in at least an open position and a closed position; and connecting means whereby two or more carts may be interconnected, said connecting means including:

a pair of upper connecting brackets means;

a pair of lower connecting bracket means; and a pair of substantially rectangular rod pieces interconnecting said upper bracket means to said lower bracket means.

31. The cart of claim 30 wherein:

each of said first and second frame means has an inverted U-shape, said U-shape including two substantially vertical legs having a cross-piece member therebetween.

32. The cart of claim 31 wherein:

said first and second bag retension bar means are rigidly connected to each of said cross-piece members.

33. The cart of claim 32 wherein each of said bag retension bar means includes:

two parallel straight portions interconnected at each end by a U-shape retaining member.

34. The cart of claim 31 wherein at least one of said cross-piece members includes:

at least one strip of Velcro-type fastener, said strip capable of mating with a corresponding strip of Velcro-type fastener on a bag.

35. The cart of claim 30 wherein said collapsable base means includes:
a pair of pivotally connected grill portions.

36. The cart of claim 30 wherein said roller means comprises casters.

37. The cart of claim 30 wherein:
said locking means is attached to said base means.

38. The cart of claim 37 wherein:
said locking means is a hook.

39. The cart of claim 30 wherein said slidable cover means includes:
lid means having at least two opposite depending side walls;
pivoting shaft means rotatably attached between said side walls;
a pair of hinge means rigidly attached to said shaft, said hinge means being capable of sliding along at least one of said frame means.

40. The cart of claim 39 including:
support stop means being attached to at least one of said frame means thereby allowing said lid means to retain an open position.

41. The cart of claim 40 wherein:
said hinge means are capable of swinging over said support stop means during folding.

42. The cart of claim 40 wherein:
said stop means are spherically shaped.

43. The cart of claim 30 including:
basket attachment means.

44. The cart of claim 43 wherein said basket attachment means includes:
at least one basket, said basket being connected to connecting bracket means; and
end frame support means attached to said connecting bracket means, said end frame support means having roller means.

45. The cart of claim 44 including:
support bar means whereby support is provided to the midsection of said basket attachment means.

46. The cart of claim 43 wherein said basket attachment means includes:
plural baskets, said plural baskets being connected to connecting bracket means, said plural baskets being disposed over and vertically aligned with each other; and
end frame support means attached to said connecting bracket means, said end frame support means having roller means.

* * * * *